(12) United States Patent
Nonogaki et al.

(10) Patent No.: US 8,383,288 B2
(45) Date of Patent: Feb. 26, 2013

(54) FUEL CELL SEPARATOR AND MOLDING METHOD FOR FUEL CELL SEPARATOR

(75) Inventors: Akihiro Nonogaki, Tochigi (JP); Satoshi Oyama, Tochigi (JP); Mikihiko Kimura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1059 days.

(21) Appl. No.: 12/365,635

(22) Filed: Feb. 4, 2009

(65) Prior Publication Data
US 2009/0197146 A1    Aug. 6, 2009

(30) Foreign Application Priority Data
Feb. 6, 2008    (JP) .................................. 2008-025921

(51) Int. Cl.
*H01M 2/16*    (2006.01)
*H01M 2/18*    (2006.01)
(52) U.S. Cl. ...................................................... 429/508
(58) Field of Classification Search .................. 429/468, 429/469, 508
See application file for complete search history.

(56) References Cited

U.S. PATENT DOCUMENTS
2005/0118484 A1 *    6/2005    Kawachi et al. ................. 429/35

FOREIGN PATENT DOCUMENTS
JP    2004-058442 A    2/2004

* cited by examiner

*Primary Examiner* — Matthew Daniels
*Assistant Examiner* — Erin Snelting
(74) *Attorney, Agent, or Firm* — Arent Fox LLP

(57) ABSTRACT

The present invention provides a resin molding method for fuel cell separator. The fuel cell separator includes: a resin mold region formed inward a predetermined distance from an edge; a through hole formed at the resin mold region; and a front end region formed between the through hole and the edge at the resin mold region. The resin molding method includes: a die set process that the resin mold region of the fuel cell separator is set in the die such that the front end region is held by a pair of anti-deformation pins of the die; and a resin filling process that a resin is filled in the die, wherein the resin is molded on the resin mold region of the fuel cell separator so as to be filled in the through hole, and a resin member is thereby molded on the resin mold region so as to extend outward from the edge.

2 Claims, 3 Drawing Sheets

FUEL CELL SEPARATOR AND MOLDING METHOD FOR FUEL CELL SEPARATOR

BACKGROUND OF THE INVENTION

1. Field of the Invention

The present invention relates to a separator of solid polymer electrolyte fuel cell, and it relates to a resin molding method for a portion of the separator.

2. Description of Related Art

In recent years, fuel cells are known as driving sources for automobiles or the like. In typical fuel cells, separators are applied to both sides of a plate-shaped electrode (MEA: Membrane Electrode Assembly) so as to form a, layered structure (cell) as a unit, and plural units are stacked to form a fuel cell stack. The MEA is a three-layered structure that a polymerized electrolytic membrane, which is made of an ion-exchange resin or the like, is held by a pair of gas diffusion electrode plates (positive electrode plate (cathode) and negative electrode plate (anode)). The gas diffusion electrode plate is structured such that a gas diffusion layer is formed on the outside of a catalytic layer which contacts the polymerized electrolytic membrane. The separator is layered so as to contact the gas diffusion electrode plate of the MEA. Gas passages for circulating a gas and coolant passages are formed between the gas diffusion electrode plate and the separator. In the fuel cell, for example, hydrogen gas as a fuel is supplied to the gas passages facing the gas diffusion electrode plate at the negative electrode plate side, and an oxidizing gas (oxygen, air, or the like) is supplied to the gas passages facing the gas diffusion electrode plate at the positive electrode plate side, and electricity is thereby generated by electrochemical reaction.

The separator should have characteristics that electrons generated by the catalytic reaction of the hydrogen gas at the negative electrode plate side are supplied to an external circuit, while electrons from the external circuit are supplied to the positive electrode plate side. Electrically conductive materials such as carbon-containing materials or metal-containing materials are used as the separator. In particular, the separator made of the metal-containing materials is superior in mechanical strength, and the weight reduction and the size reduction thereof can be performed by the thickness reduction. Thus, the separator made of the metal-containing materials is advantageous. The separator made of the metal-containing materials is produced such that thin plates of stainless steel used as a material are formed so as to have a corrugated cross section by press forming, and grooves formed on the surface and the rear surface thereof are used as the gas passages and the coolant passages.

In separators, a resin member is partially provided at a peripheral edge portion of separator as a positioning member used in layering, a guarding and reinforcing member for movement prevention of the cell due to collision, or the like. In this case, the resin member may be connected to the peripheral edge portion of separator by using an adhesive. However, in this method using the adhesive, since the resin member is separately produced, and it is applied to the separator by using the adhesive, the production cost is higher. In addition, hardening of the adhesive is time-consuming, and it is difficult to obtain a high connection strength. Since the adhesive is used for the connection of the resin member and the separator, there are limits for improving size accuracy.

In order to solve the above problems, a method has been proposed in which a resin is molded at a peripheral edge portion of separator so that molding and connection are performed simultaneously. For example, as a technique in which a resin is molded to a thin parts of metal or the like, a resin molding method has been known in which a parts is set in a die, and a resin is injected to the die (for example, Japanese Unexamined Patent Application Publication No. 2004-58442).

In the resin molding method in Japanese Unexamined Patent Application Publication No. 2004-58442, the overall of the parts (which is an electronic substrate in Japanese Unexamined Patent Application Publication No. 2004-58442) is provided in the die, the resin is injected in the die, so that almost overall of the parts is molded by the resin. When this method is used such that the resin is molded at only the peripheral edge portion of separator, the peripheral edge portion of separator is held between two dies, and the resin is injected. In this method disclosed in Japanese Unexamined Patent Application Publication No. 2004-58442, the resin molding is not performed on the overall of the parts which is the separator. Due to this, when force is applied from the peripheral edge portion of separator to the outside, a resin member formed by this method may be separated from the separator, and it may be fallen down. That is, it is difficult to secure the connection strength of the separator and the resin member.

SUMMARY OF THE INVENTION

An object of the present invention is to provide a resin molding method which can perform molding of a resin member and can perform connection of the resin member to a peripheral edge of fuel cell separator at low cost, for short time period, and with a high size precision, and can improve connection strength of fuel cell separator greatly. An object of the present invention is to provide a fuel cell separator obtained by the resin molding method of the present invention.

According to one aspect of the present invention, a resin molding method for fuel cell separator is provided. The fuel cell separator includes: a resin mold region formed inward a predetermined distance from an edge; a through hole formed at the resin mold region; and a front end region formed between the through hole and the edge at the resin mold region. The resin molding method includes: a die set process that the resin mold region of the fuel cell separator is set in the die such that the front end region is held by a pair of anti-deformation pins of the die; and a resin filling process that a resin is filled in the die, wherein the resin is molded on the resin mold region of the fuel cell separator so as to be filled in the through hole, and a resin member is thereby molded on the resin mold region so as to extend outward from the edge.

In the above molding method of the present invention, since the resin of the resin member is filled in the through hole formed at the resin mold region, the resin member engages with the through hole, and removal of the resin member from the separator can be prevented by the wedge effect. Since the front end region receives the pressure by the injection thereof, it may be easily deformed when the resin is injected into the die. However, in the above molding method of the present invention, since the front end region is sandwiched and supported by the paired anti-deformation pins, the deformation of the front end region can be effectively prevented. Since the formation of the resin member and the connection of the resin member to the separator are simultaneously performed by the molding of the resin to the resin mold region of the separator, they can be performed at low cost, for short time period, and with a high size precision.

In a case in which a primer is applied as an adhesive to the surface of the resin member after the resin molding, when the anti-deformation pins project orthogonally from the main body portion, the applied primer may not be easily reach the orthogonal inner corner portion. In this case, the resin member may have an inner peripheral surface of the hole formed by the anti-deformation pin, and the above inner corner portion may be formed at the side of the resin member at which the inner peripheral surface facing the surface of the separator. When the anti-deformation pins project from a main body of the die so as to be tapered, the inner corner portion of the resin member at which the shapes of the anti-deformation pins are transferred may have an obtuse angle which is larger than a right angle, and the primer may be easily applied. Thus, this feature is desirable.

In the die process, the anti-deformation pins desirably press the front end region of the fuel cell separator. In this feature, since the front end region is strongly held by the paired anti-deformation pins, the front end region can be reliably supported by the paired anti-deformation pins, and the anti-deformation effects of the front end region can be improved.

According to a preferred embodiment of the present invention, the anti-deformation pins have an front end surface contacting the resin mold region of the fuel cell separator, and the front end surface of the anti-deformation pins have a concave and a convex formed thereon. Thus, the anti-deformation effects of the front end region can be improved.

According to a preferred embodiment of the present invention, the surface of the resin mold region of the fuel cell separator has a concave and a convex formed thereon. Thus, the adhesion effect of the resin to the resin mold region can be obtained, so that the connection strength of the resin member to the separator can be more improved.

According to a preferred embodiment of the present invention, the edge of the fuel cell separator has a notch shape which is cut to be almost U-shaped or V-shaped, and a plurality of the through hole are formed along the edge. In this case, a plurality of the anti-deformation pins of the die are desirably arranged along the edge in order to reliably improve the anti-deformation effects of the front end region.

When the edge of the fuel cell separator has the above notch shape, a plurality of the through hole of the fuel cell separator may be disposed at an edge portion side of the arrangement of the through hole more densely than at a center portion side of the arrangement of the end portion side of the notch portion may be lower than that of the back side of the notch portion, and the edge portion side of the notch portion may easily receive stress when impacting another member. Therefore, the edge portion side of the notch portion is desirably reinforced. In this feature, the through holes of the fuel cell separator may be disposed at the edge portion side of the arrangement of the through holes more densely than at the center portion side of the arrangement of the through holes, so that the connection strength of the resin member to the separator can be more improved.

According to one aspect of the present invention, a fuel separator is obtained by the resin molding method of the present invention. The fuel cell separator includes: a resin mold region formed inward a predetermined distance from an edge; a plurality of through holes formed at the resin mold region; and a front end region formed between the through holes and the edge at the resin mold region, wherein the resin is molded on the resin mold region of the fuel cell separator so as to be filled in the through holes, and a resin member is thereby molded on the resin mold region so as to extend outward from the edge, wherein the edge of the fuel cell separator has a notch shape which is cut to be almost U-shaped or V-shaped, and the through holes are formed along the edge, wherein plural holes having no resin filled therein are arranged along the edge on the front end region. The holes of the present invention are formed after removal of the anti-deformation pins of the die used in the resin molding method.

According to a preferred embodiment, in order to improve the connection strength of the resin member to the separator, the surface of the resin mold region of the fuel cell separator has a concave and a convex formed thereon. According to a preferred embodiment, a plurality of the through holes of the fuel cell separator are disposed at an edge portion side of the arrangement of the through holes more densely than at a center portion side of the arrangement of the through holes. This embodiment is desirable in order to reinforce the end portion side.

According to the present invention, the molding of the resin member and the connection of the resin member to the separator can be performed at low cost, for short time period, and with a high size precision.

BRIEF DESCRIPTION OF THE DRAWINGS

FIG. 4 shows a condition in which a resin is injected in a die, and FIG. 4B shows a portion of a separator which is removed from the die.

FIG. 5A shows an anti-deformation pin and a hole of another embodiment, and FIG. 5B shows an anti-deformation pin and a hole of one embodiment.

DESCRIPTION OF THE PREFERRED EMBODIMENTS

Figure 1:
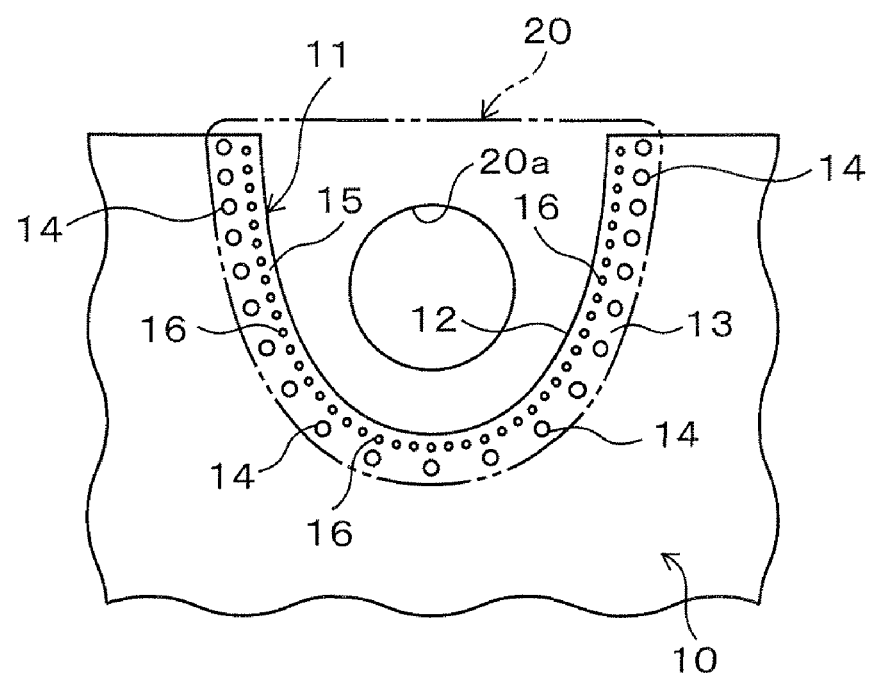
FIG. 1 is a plain view showing a portion of a fuel cell separator of one embodiment according to the present invention.

One embodiment of the present invention will be described hereinafter with reference to Figures.
1. Fuel Cell Separator FIG. 1 is a plain view showing a portion of a peripheral edge portion of a fuel cell separator 10 (hereinafter referred to as "separator 10") of the embodiment. This separator 10 is a thin plate composed of stainless or the like (which has a thickness of about 0.15 mm, for example). A U-shaped notch portion 11 is formed at a portion of the peripheral edge portion. A resin member 20 (shown by two-dotted line in FIG. 1) is provided at the notch portion 11. The resin member 20 is a member for positioning plural separators 10 when they are layered, and it has a shape similar to the notch portion 11. An insertion hole 20a, into which a member (a positioning rod or the like) is inserted, is formed at a center portion of the resin member 20.

The resin member 20 is formed so as to sandwich both surfaces of a resin mold region 13 of the separator 10, so that the resin member 20 is connected to the separator 10. In this case, the resin mold region 13 is an inner region which has a predetermined width from a U-shaped edge 12 of the notch portion 11 and which extends therealong. The resin member 20 extends from the edge 12 to the outside (to a space in the notch portion 11), and it almost entirely covers the notch portion 11.

Plural circular through holes 14 are formed at the resin mold region 13 of the separator 10 which has a predetermined width along the U-shaped edge 12. The resin of the resin member 20 is filled in the through holes 14. The through holes 14 are formed at an approximate center portion of width direction of the resin mold region 13, and they are arranged in line along the U-shape of the edge 12. In this embodiment, the through holes 14 are not arranged at an equal interval. The intervals between the through holes 14 at both edge portion sides of the notch portion 11 are narrower than the intervals between the through holes 14 at the center portion side of the back side of thereof. That is, the through holes 14 are arranged more densely at both edge portion sides of the notch portion 11 than at the center portion side of the back side thereof.

A front end region 15 having a width, which is, for example, almost equal or larger than the diameter of the through hole 14, is formed between the through holes 14 of the resin mold region 13 and the edge 12. Plural circular holes 16 are arranged along the edge 12 on both surfaces of this front end region 15. The holes 16 are formed by anti-deformation pins of a die described hereinafter, and the holes 16 at an upper side surface and at a lower side surface of the separator 10 are paired. The holes 16 are arranged in line so as to be spaced equally from each other along the edge 12.

A size example of each portion of the separator 10 is as follows. For example, the resin mold region 13 has a width of about 3 mm. Each through hole 14 has a diameter of 0.15 mm. For example the through holes 14 are spaced about 3 to 8 mm from each other. For example, the shortest interval of the through holes 14 at both end portion sides is about 3 mm, and the longest interval of the through holes 14 at the center portion side is about 5 mm.

2. Molding of Resin Member

Next, a method for providing the resin member 20 to the notch portion 11 of the separator 10 will be explained.

FIGS. 2A to 2D are cross sectional views showing the molding method in turn. In FIGS. 2A to 2D, reference numeral 30 denotes a die having an upper die 31 and a lower die 32. The upper die 31 is different from the lower die 32 in having a gate 31a for resin injection, and the dies 31 and 32 have the same structures other than this difference. The dies 31 and 32 are clamped such that the insides thereof face each other, so that the die 30 is constructed, and a cavity 30a for molding of the resin member 20 is formed in the die 30. In order to improve the detachability of the cured resin from inner surfaces of the dies 31 and 32, an appropriate parting agent may be applied on the inner surfaces of the dies 31 and 32 beforehand, if necessary.

The resin mold region 13 of the separator 10 having the plural through holes 14 formed therein is horizontally inserted into the die 30. In this case, in the condition that the resin mold region 13 is inserted into the insides of the dies 31 and 32, the anti-deformation pins 33 are formed so as to hold the front end region 15 therebetween and support it horizontally. That is, the resin mold region 13 of the separator 10 is set in the die 30 in the condition that the front end region 15 is held by the paired upper and lower anti-deformation pins 33. Plural anti-deformation pins 33 are formed on the dies 31 and 32 so as to be spaced equally from each other.

For example, the distance between the center of the anti-deformation pin 33 and the edge 12 is 2 mm or less, and it is desirably 0.8 to 1.2 mm. For example, the diameter of the anti-deformation pins 33 (that is the diameter of the hole 16) is about 0.5 mm. For example, the interval between the anti-deformation pins 33 next to each other is about 1 to 4 mm. When the interval between the anti-deformation pins 33 next to each other is less than 1 mm, flow resistance of the resin in resin molding increases, and the filling of the resin may be insufficient. When the interval between the anti-deformation pins 33 next to each other exceeds 4 mm, the front end region 15 may be easily deformed.

Figure 2A:
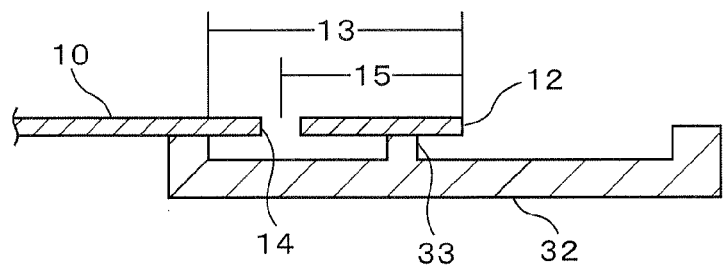
FIGS. 2A to 2D are cross sectional views showing a molding method of one embodiment in turn.
Figure 2B:
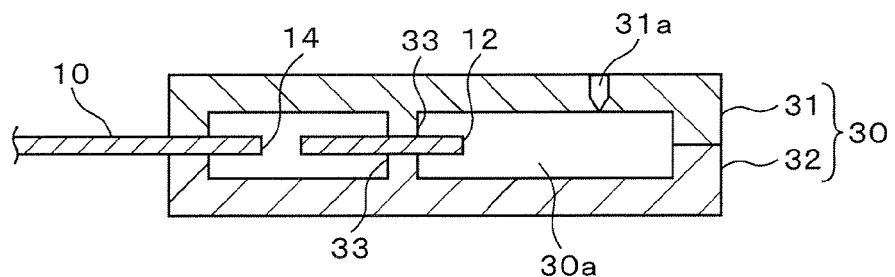

In the method for providing of the resin member 20 to the notch portion 11 of the separator 10, as shown in FIG. 2A, first, the resin mold region 13 of the separator 10 is inserted into the inner portion of the lower die 32, and the anti-deformation pins 33 contact the lower surface of the front end region 15. Next, as shown in FIG. 2B, the upper die 31 is disposed on the lower die 32, and the dies 31 and 32 are clamped, so that the die 30 is constructed (die set process). In this condition, the anti-deformation pins 33 of the upper die 31 also contact the front end region 15 of the separator 10, so that the front end region 15 is held and supported horizontally by the plural upper and lower anti-deformation pins 33.

Figure 3:
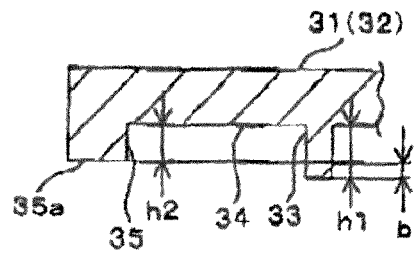
FIG. 3 is a cross sectional view of a portion of die which shows a projection condition of a anti-deformation pin.

As shown in FIG. 3, in the anti-deformation pins 33 of the dies 31 and 32, in order to sandwich and support the front end region 15, the projection height h1 of the anti-deformation pin 33 from the main body 34 of the die 31 (32) is required to be equal to the height h2 of the side plate portion 35 for sandwiching at least the separator 10. The projection height h1 of the anti-deformation pin 33 may be slightly higher than the height h2 of the side plate portion 35. In this feature, in the condition that the separator 10 is set in the die 30, the anti-deformation pins 33 at the upper side and the lower side are embedded to the front end region 15 and they press the front end region 15. Thus, the front end region 15 is strongly held by the paired anti-deformation pins 33 of upper side and the lower side, and the horizontal supported feature of the front end region 15 is strongly secured. Therefore, this feature is desirable. When the projection height h1 of the anti-deformation pin 33 is slightly higher than the height h2 of the side plate portion 35, the height difference amount therebetween (that is, the projection amount b of the side plate portion 35 from the die dividing surface 35a) is about 0.005 mm, for example.

Figure 2C:
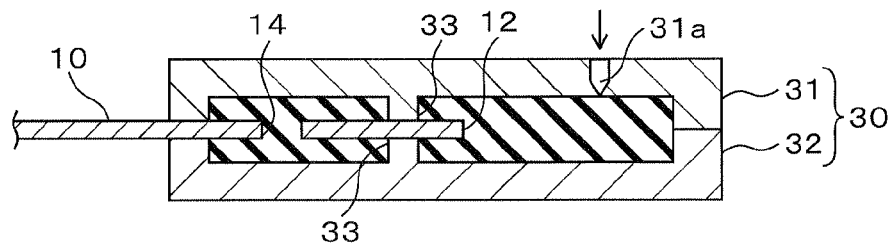
Figure 2D:
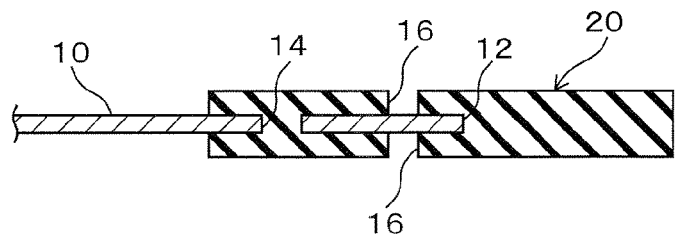

After clamping of the die 30, the die 30 is heated to a predetermined temperature and it is held. As shown in FIG. 2C, a thermoplastic resin 21 is injected from the gate 31a of the upper die 31 to the cavity 30a, and the die 30 is filled with the thermoplastic resin 21 (resin filling process). After the resin 21 is cured and the molding of the resin member 20 is performed, the die 30 is opened, and the separator 20 having the resin member 20 is removed from the die 30, and it is obtained as shown in FIG. 2D. In this separator 10, (the resin member 20 is provided on the notch portion 11, and the plural holes 16 are formed on the both surfaces of the front end region 15 of the resin member 20. The holes 16 are formed by using the anti-deformation pins 33 as a core.

In the above molding method of the one embodiment, since the resin of the resin member 20 is filled in the through holes 14 formed at the resin mold region 13, the resin member 20 engages with the through holes 14, and removal of the resin member 20 from the separator 10 is prevented by the wedge effect. In addition, the adhesion effect of the resin to the resin mold region 13 is also obtained, so that the connection strength of the resin member 20 to the separator 10 is greatly improved.

Since the formation of the resin member 20 and the connection of the resin member 20 to the separator 10 are simultaneously performed by the molding of the resin to the resin mold region 13 of the separator 10, they are performed at low cost, for short time period, and with a high size precision. The surface of the resin mold region 13 of the separator 10 which is covered with the resin may be concave and convex. In this case, the fix strength of the resin mold region 13 to the resin is improved, and the connection strength of the resin member 20 to the separator 10 can be more improved.

Since the front end region 15 between through holes 14 and the edge 12 of the separator 10 is extremely thin, the front end region 15 receives the pressure by the injection thereof, and it is easily deformed when the resin 21 is injected into the die 30. However, in this embodiment, since the front end region 15 is sandwiched and supported by the paired anti-deformation pins 33 of upper side and the lower side, the deformation of the front end region 15 can be effectively prevented. In particular, when the anti-deformation pins 33 are embedded into the front end region 15 and pressed as described above, the front end region 15 can be more strongly supported, and the anti-deformation effects can be more improved. The surfaces of the anti-deformation pins 33 which contact the front end region 15 may be concave and convex. In this case, movement prevention effects of the front end region 15 can be improved, and the anti-deformation effects can be more improved.

The strength of both edge portion sides of the notch portion 11 is lower than that of the back side of the notch portion 11, and both edge portion sides of the notch portion 11 easily receive stress when impacting another member. Therefore, both edge portion sides of the notch portion 11 are desirably reinforced. In this embodiment, in the separator 10 in which the resin is filled, the intervals between the through holes 14 next to each other, are narrower at both of the edge portion sides of the notch portion 11 extending along the edge 12 than the center portion side thereof, and the through holes 14 at both of the edge portion sides of the notch portion 11 are more densely arranged than at the center portion side thereof. Therefore, the connection strength of the resin member 20 to the separator 10 is higher at both of the edge portion sides of the notch portion 11 than at the center portion side thereof, and both of the edge portion sides thereof are effectively reinforced.

3. Another Embodiment

Figure 4A:
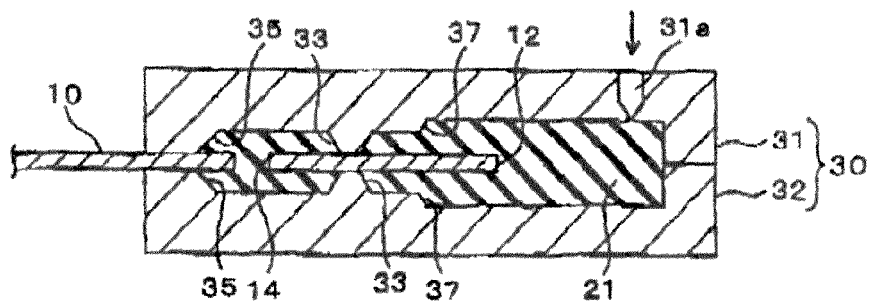
FIGS. 4A and 4B are cross sectional views showing a molding method of another embodiment according to the present invention.
Figure 4B:
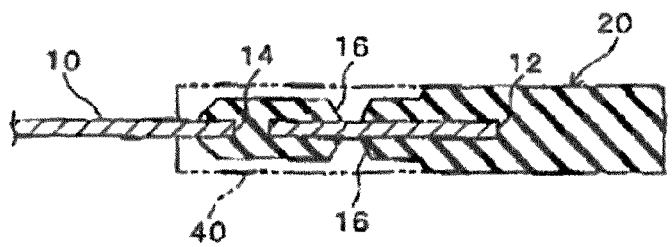

FIGS. 4A and 4B are cross sectional views showing a molding method of another embodiment, which is modified from that of the above embodiment.

Figure 5A:
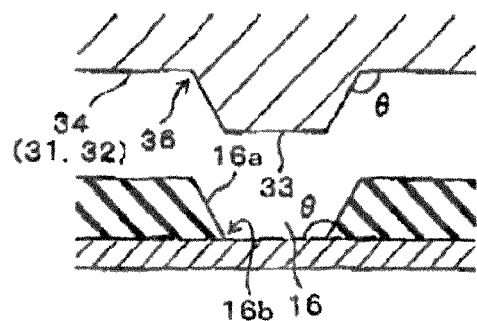
FIGS. 5A and 5B are cross sectional views showing an anti-deformation pin of the die and a hole of a resin member formed by the anti-deformation pin.
Figure 5B:
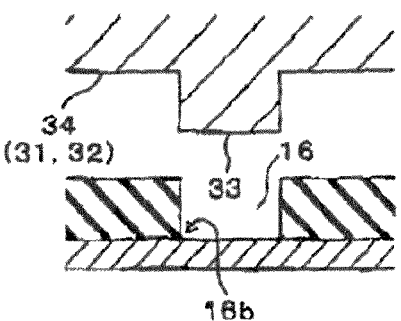

As shown in FIG. 5A, the anti-deformation pins 33 of the upper and the lower dies 31 and 32 of this embodiment project from the main body portion 34, and they are tapered so as to have a trapezoidal cross section. An inner corner portion 36 formed by the anti-deformation pin 33 and the main body portion 34 have an obtuse angle θ. In addition to the anti-deformation pins 33, inner surfaces of the side plate portions 35 holding the separator 10 are also tapered. In the inner surfaces of the side plate portions of the dies 31 and 32 of this embodiment, the resin member 20 covering the front end region 15 is thicker at the outside portion (the right side in FIGS. 4A and 4B) than at the portion proximate to the holes 16, and steps 37 formed between the thin portion and the thick portion is also tapered.

In the resin member 20 molded by the die 30 of this another embodiment, as shown in FIG. 5A, the resin member 20 has an inner peripheral surface 16a of the hole 16 formed by the anti-deformation pin 33, and an inner corner portion 16b is formed at the side of the resin member 20 at which the inner peripheral surface 16a facing the surface of the separator 10. The inner corner portion 16b has an angle which is equal to the angle θ of the inner corner portion 36 of the dies 31 and 32 by transferring of the inner corner portion 36 of the dies 31 and 32. This transferring can be performed at portions of the resin member 20, which are formed by the side plate portion 35 and the step 37.

In this separator, as shown in FIG. 4B, a seal 40 of silicone or the like is adhered to the surface of the resin member 20. In this case, a primer is applied as an adhesive to the surface of the resin member 20. In this embodiment, since the inner corner portion 16b of the resin member 20 is obtuse, the applied primer easily reaches the inner corner portion 16b of the resin member 20. This action can be also obtained at the portions formed by the side plate portion 35 and the step 37. Therefore, a portion at which the primer is not applied does not remain at the surface of the resin member 20, and the productivity can be improved. When the anti-deformation pins 33 project orthogonally from the main body portion 34, the applied primer may not be easily reach the orthogonal inner corner portion 16b. When the anti-deformation pins 33 are tapered, for example, the angle θ of the inner corner portion 16b is about 110 degrees

EXAMPLES

Examples of the present invention will be explained hereinafter.

[Sample]

A SUS plate having a thickness of 0.15 mm was formed so as to have a shape similar to a desired shape of fuel cell separator by processing. At a peripheral edge portion of the SUS plate, plural notch portions having a U-shaped cross section shown in FIG. 1 were formed. At a resin mold region set around the notch portions, plural through holes having a diameter of 1.5 mm were formed along an edge in line. As a result, a separator was obtained. The resin mold region had a width of 3 mm and, it had an interval of 4 mm between the through holes.

In order to form a resin member at the notch portion of the separator, as shown in FIGS. 2A to 2D, the resin mold region of the separator was set so as to be inserted in the upper and the lower dies. Anti-deformation pins had a diameter of 0.5 mm, and they were formed at a position of 1 mm away from a front end region of the separator so as to be spaced 2 mm from each other. Next, a thermoplastic resin was injected into the heated die, and the resin member was connected to the separator and it was molded to have a predetermined shape. A polyphenylene sulfide including 40% of glass fiber was used as the thermoplastic resin. Regarding a molding condition, temperature of resin in injection was 320 degrees C., heating temperature of the die was 140 degrees C., molding pressure of resin was 200 MPa, and injection speed of resin was 300 mm/s, and injection time period was 0.05 second.

[Comparative Sample]

A separator of the comparative sample was different from that of the sample in having no through hole formed at the resin mold region, and the separator of the comparative sample had the same construction as that of the sample other than this difference. In the comparative sample, a resin member was separately formed beforehand, and the resin member was connected to one surface of the resin mold region by adhesion using an adhesive.

In the sample and the comparative sample, time period per one connection of the resin member, size precision, and connection strength were measured. In the sample, the connection time period was a time period in which the separator was set in the die, the resin was injected into the die, and the molded resin member was removed from the die. In the comparative sample, the connection time period was a time period in which the adhesive for adhering the resin member to the separator was cured. The size precision was position movement value of the resin member to the resin mold region. The connection strength was a load measured when the resin member was cut in tension test in which the resin member was pulled from the separator. The results were shown in Table 1.

TABLE 1

|  | Sample Product of Present invention | Comparative Sample Adhesion |
|---|---|---|
| Connection time period (second) | 4 | 180 |
| Size precision (mm) | 0.03 | 0.15 |
| Connection strength (kgf) | 100 | 50 |

As shown in Table 1, it was confirmed that the connection time period of the sample was much shorter than that of the comparative sample and the sample was superior to the comparative sample in productivity. The resin can be simultaneously injected to plural cavities in the injection molding. Therefore, the resin may be simultaneously molded into plural resin members and may be connected to plural portions of the separator, so that this method may be desirable to mass production. The sample was also superior to the comparative sample in the results of the size precision and connection strength. Thus, the effects of the present invention were substantiated.

What is claimed is:

1. A fuel cell separator comprising:
a thin plate composed of an electrically conductive material:
a resin mold region formed on the thin plate inward a predetermined distance from an edge of the thin plate;
a plurality of through holes formed at the resin mold region of the thin plate and penetrating the thin plate; and
a front end region formed between the plurality of through holes and the edge of the thin plate at the resin mold region of the thin plate,
wherein a resin member composed of a resin is molded so as to be disposed on the resin mold region of the thin plate and have a shape extending outward from the edge of the thin plate, and the resin is filled in the plurality of through holes,
wherein the edge of the thin plate has a notch shape which is cut to be substantially U-shaped or V-shaped, and the plurality of through holes are formed along the edge,
wherein plural holes having no resin filled therein are arranged along the edge of the thin plate on the front end region of the thin plate.

2. A fuel cell separator according to claim 1, wherein the plurality of the through holes of the thin plate are more densely disposed at an edge portion side than at a center portion side of the resin mold region of the thin plate.

* * * * *